(12) United States Patent
Tankleff et al.

(10) Patent No.: US 8,780,125 B2
(45) Date of Patent: Jul. 15, 2014

(54) INTELLIGENT DISPLAY

(75) Inventors: Bruce Aaron Tankleff, The Woodlands, TX (US); Jeffrey Dale Cole, Torrance, CA (US); James Ronald Pace, Cypress, TX (US); Courtney D. Goeltzenleuchter, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2367 days.

(21) Appl. No.: 11/540,901

(22) Filed: Sep. 29, 2006

(65) Prior Publication Data

US 2008/0079740 A1    Apr. 3, 2008

(51) Int. Cl.
 G09G 5/36   (2006.01)
 G06F 9/54   (2006.01)
 G09G 5/00   (2006.01)

(52) U.S. Cl.
 CPC .......... *G09G 5/003* (2013.01); *G09G 2360/18* (2013.01); *G06F 9/543* (2013.01)
 USPC ............................ 345/545; 345/547; 345/548

(58) Field of Classification Search
 USPC ........................................ 345/545, 547, 548
 See application file for complete search history.

(56) References Cited

U.S. PATENT DOCUMENTS

| | | | |
|---|---|---|---|
| 6,556,208 B1* | 4/2003 | Congdon et al. .............. 345/520 |
| 2004/0130568 A1* | 7/2004 | Nagano et al. ................ 345/733 |
| 2005/0015528 A1* | 1/2005 | Du .................................. 710/68 |
| 2006/0139493 A1* | 6/2006 | Kim .............................. 348/576 |

* cited by examiner

*Primary Examiner* — Hau Nguyen

(57) ABSTRACT

In one embodiment, a display device comprises a graphics interface, an image processing system, an input device coupled to the image processing system to receive a screen capture signal and transmit the screen capture signal to the image processing system, and a storage subsystem coupled to the image processing system to store, in response to the screen capture signal, screen capture data generated by the image processing system.

19 Claims, 2 Drawing Sheets

INTELLIGENT DISPLAY

BACKGROUND

Users of complex computing systems may experience the need to prepare documentation of information generated on the computing system(s). Conventionally, this information is made available to users through one or more programs running under an operating system executing on the computer system(s). The information may be presented to users via a user interface such as, e.g., a display device, and may be recorded in memory via a utility such as, e.g., a screen grab. A failure in the operating system may render ineffective techniques such as, e.g., screen grabs, in the event of an operating system failure. Mechanisms independent from the operating system to provide access to screen data find utility.

DETAILED DESCRIPTION

Figure 1:
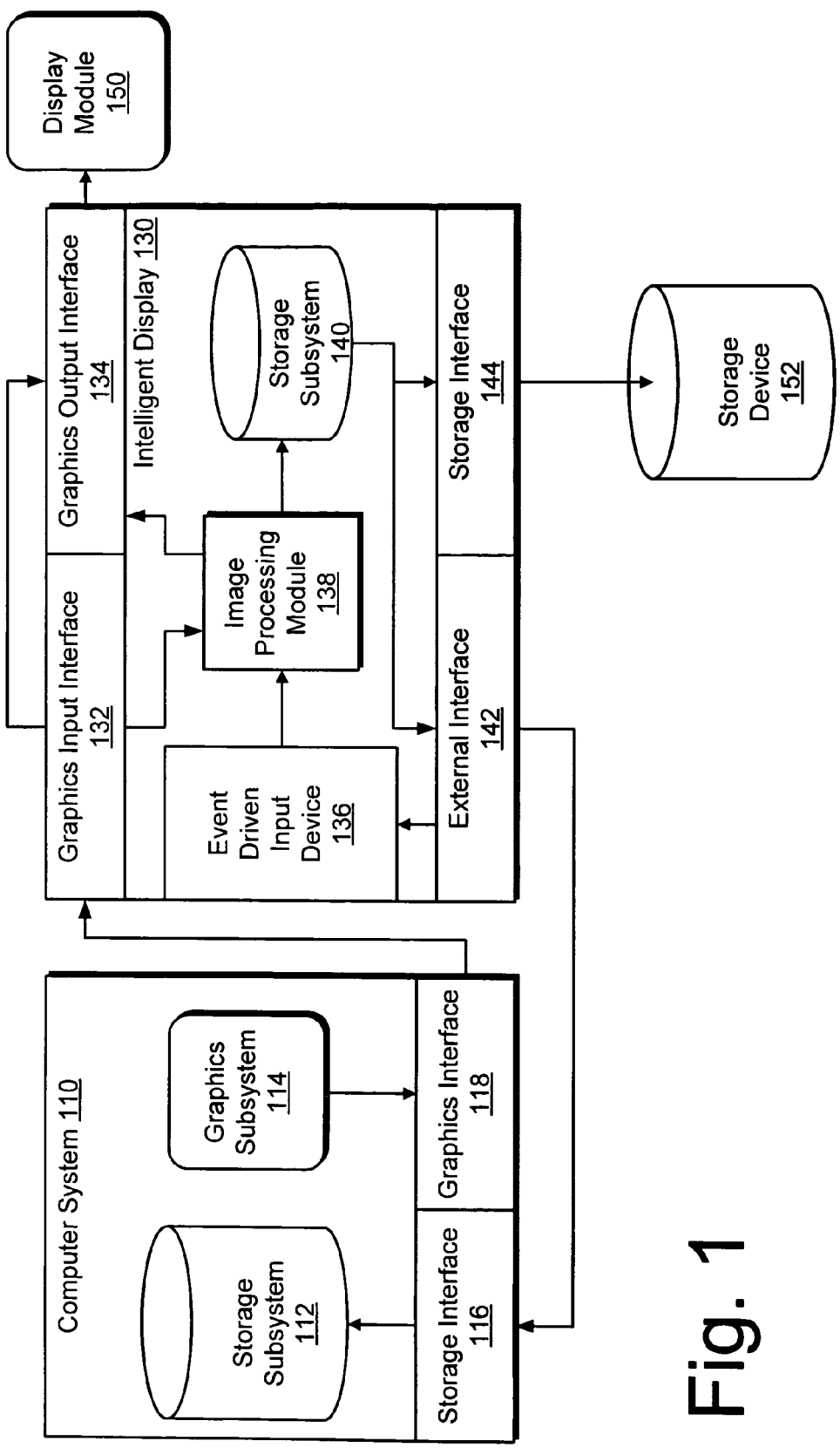
FIG. 1 is a schematic illustration of an intelligent display assembly according to an embodiment.

FIG. 1 is a schematic illustration of an intelligent display 130 according to an embodiment. Referring to FIG. 1, the display 130 comprises a graphics input interface 132 and a graphics output interface 134. In one embodiment, the graphics interfaces 132, 134 are adapted to process graphics data in digital and/or analog formats. Display 130 further comprises an image processing module 138 that processes graphics data for display on a display module 150 via the graphics output interface 134.

Image processing module 138 may be adapted to process graphics data in one or more formats. In one embodiment, image processing module 138 may be adapted to process graphics formatted using analog formats such as, e.g., the Video Graphics Array (VGA) format, or derivatives thereof (e.g., SVGA, XVGA, QVGA, etc.). In an alternate embodiment, image processing module 138 may be adapted to process graphics formatted using digital graphics such as, e.g., the Digital Video Interface (DVI) format. In embodiments, the image captured may be a single frame of data, or a series of frames captured over a period of time. The image processing module 138 may process the data for immediate display on a display module 150 via the graphics output interface 134, or convert the data to a standard output file format (TIFF, JPEG, GIF, BMP, AVI, MPEG, etc.) for later on-line or off-line storage.

Intelligent display 130 further comprises a storage subsystem 140 coupled to image processing module 138. In one embodiment, storage subsystem 140 may comprise volatile memory such as random access memory (RAM, DRAM, etc.). Storage subsystem 140 may comprise non-volatile memory such as, e.g., read-only memory (ROM), flash memory, magnetic memory, optical memory, and the like. Intelligent display 130 may comprise a storage interface 144 to couple the storage subsystem 140 to an external storage device 152, which may comprise magnetic memory, optical memory, and the like.

Intelligent display 130 further comprises an external interface 142 to couple the intelligent display 130 to an external device such as e.g., a computer system 110. In one embodiment, external interface 142 implements one or more interface standards such as, e.g., Universal Serial Bus (USB), Ethernet, or the like. Intelligent display 130 further comprises an event-driven input device 136. In one embodiment, event-driven input device 136 is implemented as a physical interface such as, e.g., a button or other device on intelligent display 130. In alternate embodiments, event-driven input device 136 is embodied as logic that detects the occurrence of an input event. For example, event-driven input device 136 is embodied as logic that receives an input from external interface 142. The input may be generated by computer system 110. Alternatively, the event-driven input device 136 may detect the connection of a remote device such as, e.g., a flash memory module to intelligent display device 130. Further, the event-driven input device 136 may enable the operator to establish a time-triggered event, either at a specified time and date or after a selectable delay upon receipt of an event via the external interface 142.

Computer system 110 comprises a graphics subsystem 114 that generates graphics data in accord with a graphics standard such as, e.g., VGA, SVGA, XVGA, QVGA, DVI, etc., and a graphics interface 118 to couple graphics subsystem 114 to intelligent display 130. Computer system 110 comprises a storage subsystem 112 and a storage interface 116 to couple storage subsystem 112 to intelligent display 130.

Figure 2:
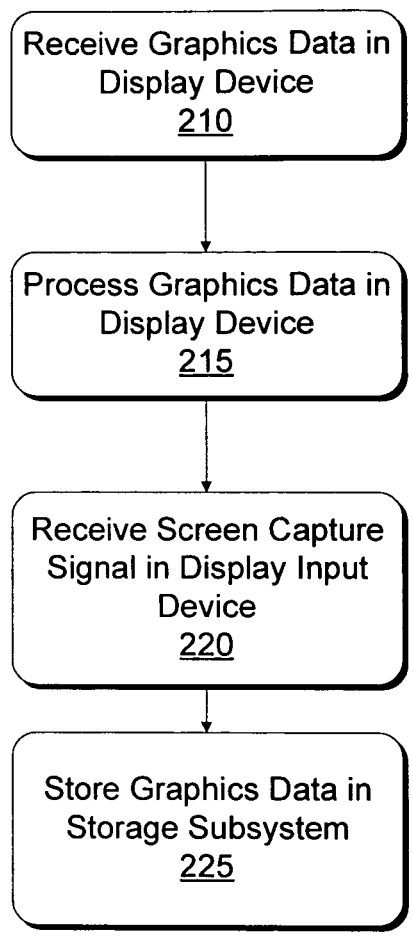
FIG. 2 is a flowchart illustrating operations for capturing screen data according to an embodiment.

FIG. 2 is a flowchart illustrating operations for capturing screen data according to an embodiment. Referring to FIG. 2, at operation 210 intelligent display device 130 receives graphics data. In one embodiment the graphics data is received from computing system 110 via graphics interfaces 118, 132. At operation 215 intelligent display 130 processes the graphics data. In one embodiment the graphics data is processed by image processing module 138 and is presented to display module 150 for display.

At operation 220 the intelligent display 130 receives a screen capture signal. In one embodiment the screen capture signal is received by the event-driven input device 136. The screen capture signal may be generated, e.g., by a user pressing a screen capture button on intelligent display 130, by detecting the connection of a remote device to intelligent display 130, or by a remote device such as, e.g., computing system 110.

At operation 225 intelligent display 130 stores the graphics data residing in the image processing module 138 in response to the screen capture signal received by the event-driven input device 136. In one embodiment, the screen capture signal is transmitted from the event-driven input device 136 to the image processing module 138. In response to the screen capture signal, the image processing module 138 transmits a copy of the image resident in image processing module 138 to the storage subsystem 140 without assistance from an operating system or other component of a computer system 110. Thus, a failure in the computer system 110 will not interfere with embodiments, e.g., the operations of FIG. 2. Storage subsystem 140 may, in turn, transmit a copy of the image to a remote storage device 152 via storage interface 144 or via external interface 142.

Reference in the specification to "one embodiment" or "an embodiment" means that a particular feature, structure, or characteristic described in connection with the embodiment is comprised in at least an implementation.

In the description and claims, the term "coupled" may mean that two or more devices are in direct physical or electrical contact, or that two or more devices may not be in direct physical or electrical contact (e.g., wireless or optical) with each other, but yet may still cooperate or interact with each other. For example, two devices may be coupled through a third device.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A display that displays images, the display, comprising:
   an interface for communicating with a computer system that is separate and external to the display;
   a display screen controlled by instructions received from the computer system via the interface;
   an image processing system that processes graphics data for display on the display screen according to the instructions from the computer system; and
   a storage subsystem coupled to the image processing system to store the graphics data generated by the image processing system and displayed on the display screen, wherein the storage subsystem stores the graphics data displayed on the display screen in response to a screen capture signal and independently of the instructions from the computer system.

2. The display of claim 1, wherein the storage subsystem stores the graphics data without assistance from an operating system of the computer system.

3. The display of claim 1, further comprising an input device coupled to the image processing system to receive the screen capture signal and transmit the screen capture signal to the image processing system, wherein the input device comprises a push button on the display.

4. The display of claim 1, further comprising an external interface to couple the display to one or more external devices.

5. The display of claim 4, wherein the screen capture data is transmitted to a remote device via the external interface.

6. A computing system, comprising:
   a computer system that includes a graphics processing subsystem; and
   a display that is separate and external to the computer system, the display, comprising:
   an interface in the display for communicating with the computer system;
   a display screen on the display and controlled by instructions received from the computer system via the interface;
   an image processing system in the display that processes graphics data for display on the display screen according to the instructions from the computer system;
   an input device in the display and coupled to the image processing system to receive a screen capture signal and transmit the screen capture signal to the image processing system; and
   a storage subsystem in the display and coupled to the image processing system to store, in response to the screen capture signal, the graphics data independently of the instructions from the computer system.

7. The computing system of claim 6, wherein the storage subsystem is configured to store the graphics data in response to the screen capture signal without assistance from an operating system of the computer system.

8. The computing system of claim 6, wherein the input device comprises a push button.

9. The computing system of claim 6, further comprising an external interface to couple the display to one or more external devices.

10. The computing system of claim 9, wherein the screen capture data is transmitted to a remote device via the external interface.

11. A method, comprising:
    receiving, in an interface in a display, graphics data from a computer system for display on a display screen of the display;
    processing, in an image processing system located in the display, the graphics data to present the graphics data on the display screen;
    receiving, at a graphics interface located in the display, a screen capture signal from an input device coupled to the image processing system; and
    in response to the screen capture signal, storing, in a storage subsystem located in the display and coupled to the image processing system, the graphics data generated by the image processing system and displayed on the display, wherein the graphics data is stored independently of the instructions from the computer system such that a failure of the computer system does not interfere with storage of the graphics data by the display.

12. The method of claim 11, wherein the storing of the graphics data is performed without assistance from an operating system of the computer system.

13. The method of claim 11, further comprising transmitting screen capture data to a remote device via an external interface.

14. A display, comprising:
    an image processing module in the display to present graphics data on a display screen;
    an input device in the display coupled to the image processing module to receive a screen capture signal and transmit the screen capture signal to the image processing module; and
    a storage subsystem located in the display;
    wherein, in response to the screen capture signal, the image processing module captures an image displayed on the display screen and forwards the image to the storage subsystem coupled to the display without assistance from an operating system.

15. The display of claim 14, further comprising:
    a graphics input interface in the display to receive graphics data from a computer system coupled to the display; and
    a graphics output interface in the display to generate a graphics output for presentation on the display screen.

16. The display of claim 14, wherein the input device comprises a push button located on the display.

17. The display of claim 14, further comprising an external interface in the display to couple the display to at least one external device.

18. The display of claim 14, wherein the screen capture data is transmitted to at least one remote device via the external interface.

19. The display of claim 18, wherein the at least one remote device comprises a computing system.

* * * * *